United States Patent [19]
Suzuki et al.

[11] Patent Number: 5,457,675
[45] Date of Patent: Oct. 10, 1995

[54] VIDEO IMAGE UPDATING AND REPRODUCING DEVICE WITH IMAGE SELECTING KEY INPUT MEANS

[75] Inventors: Kazuhiro Suzuki; Yoshimasa Hosono; Hidenori Aotake, all of Kanagawa, Japan

[73] Assignee: Sony Corporation, Tokyo, Japan

[21] Appl. No.: 180,856

[22] Filed: Jan. 13, 1994

[30] Foreign Application Priority Data

Jan. 18, 1993 [JP] Japan .................................. 5-006093

[51] Int. Cl.⁶ .................................................. G11B 20/10
[52] U.S. Cl. .......................... 369/124; 348/409; 348/419; 348/439; 348/699
[58] Field of Search .................... 358/136, 105, 358/335, 133, 141; 348/384, 390, 405, 409, 415, 416, 439, 469, 419, 699; 369/124; 360/13, 15

[56] References Cited

U.S. PATENT DOCUMENTS

| | | | |
|---|---|---|---|
| 5,175,618 | 12/1992 | Ueda et al. | 358/136 |
| 5,231,484 | 7/1993 | Gonzales et al. | 358/133 |
| 5,317,397 | 5/1994 | Odaka et al. | 348/416 |
| 5,321,508 | 6/1994 | Veltman et al. | 348/439 |
| 5,359,365 | 10/1994 | Enokida | 348/390 |

FOREIGN PATENT DOCUMENTS

| | | | |
|---|---|---|---|
| 0479233A2 | 4/1992 | European Pat. Off. | H04N 5/76 |
| 2292973 | 12/1990 | Japan | H04N 5/76 |
| 3286486 | 12/1991 | Japan | G11B 33/06 |

OTHER PUBLICATIONS

C. Herpel, et al., "Adaptation and Improvement of CCITT Reference Model 8 Video Coding for Digital Storage Media Applications," Signal Processing Image Communication 2 (1990) Aug., No. 2, Amsterdam, NE, pp. 171–185.

D. J. LeGall, "The MPEG Video Compression Standard," 36th IEEE Computer Society International Conference (Compcon 91), 1 Mar. 1991, San Francisco, US, pp. 334–335.

Primary Examiner—Scott J. Sugarman
Assistant Examiner—Kim-Kwok Chu
Attorney, Agent, or Firm—Limbach & Limbach; Philip M. Shaw, Jr.

[57] ABSTRACT

A picture reproducing apparatus includes a CD-ROM drive for fetching compressed video image data from a disc on which initial I-picture data for an initial picture for a menu display and a plurality of updating P-picture data for partially updating the initial picture are recorded. The picture reproducing apparatus also includes a RAN having a capacity of at least one video image frame and having an updating picture data storage area, an MPEG decoder for decoding MPEG encoded picture data and a CPU for initially transmitting the initial picture data and subsequently transmitting the updating picture data to the decoder. By making a picture display for displaying menu items or the like with the aid of a compressed picture decoder as used for displaying the compressed moving picture or still picture, the menu items or the like may be displayed without employing a graphic display circuit.

9 Claims, 7 Drawing Sheets

UPDATING PICTURE DATA P1

FIG. 3A

UPDATING PICTURE DATA P2

FIG. 3B

UPDATING PICTURE DATA P3

FIG. 3C

UPDATING PICTURE DATA P4

FIG. 3D

UPDATING PICTURE DATA P5

FIG. 3E

UPDATING PICTURE DATA P6

FIG. 3F

UPDATING PICTURE DATA P7

FIG. 3G

UPDATING PICTURE DATA P8

INITIAL PICTURE DATA I1

FIG. 5A

UPDATING PICTURE DATA P1

FIG. 5B

INITIAL MENU STATE

FIG. 5C

UPDATING PICTURE DATA P2

FIG. 5D

UPDATING PICTURE DATA P3

FIG. 5E

RIGHT SHIFT KEY ON

VIDEO IMAGE UPDATING AND REPRODUCING DEVICE WITH IMAGE SELECTING KEY INPUT MEANS

BACKGROUND OF THE INVENTION

1. Field of the Invention

This invention relates to a picture reproducing device for reproducing the information including the compressed picture information presented by the communication or the information recording media, such as a CD-ROM.

2. Description of the Related Art

The picture reproducing device for reproducing the customary picture information, such as the information presented by the CD-ROM, may be roughly classified into two type of devices. One such device is that in which only the picture information, such as the information of letters or pictures to be reproduced, is recorded on the CD-ROM in a pre-set form and is reproduced by a fixed program stored in the reproducing device. Examples of this type of the device include a disc player type reproducing device for reproducing a disc having recorded thereon the information contained in a dictionary, such as an English-Japanese dictionary or a Japanese-English dictionary, or an encyclopedia, and displaying the reproduced information. The other reproducing device is that in which the information to be reproduced is recorded on the CD-ROM and the program for reproducing the recorded information is recorded as an object code for the CPU of the reproducing device, with the CPU in the reproducing device reproducing and executing the program for reproducing the information on the CD-ROM. Examples of this type of the device include the CD-I type picture reproducing device.

On the other hand, a demand has recently been raised for storing moving picture data continuing for a prolonged time on a recording medium such as the above-mentioned CD-ROM. Thus a variety of data compression techniques have been proposed for compressing the moving picture data for reducing the data volume for enabling a large quantity of the moving picture data to be stored on the recording medium. A variety of compressed picture reproducing devices for reproducing data from the recording medium having the compressed picture data compressed by these various data compression techniques stored thereon have also been proposed.

Meanwhile, with these reproducing devices, the menu items or the like as selected by the user are adapted to be displayed in a majority of cases by a graphic screen in the course of the reproduction.

If the menu items are displayed in this manner by the graphic screen, the following problems arise.

First, if the display image for graphic display of the menu items or the like is directly recorded on the information recording medium, the data volume recorded on the information recording medium is increased. If it is attempted to store the moving picture data continuing for a prolonged time on the information recording medium by employing the picture compression technique, the storage capacity is decreased in an amount corresponding to the data volume for the display picture, with the result that the objective of achieving prolonged time recording cannot be accomplished.

While it is possible to transform the displayed picture into e.g. vector data or picture-drawing instructions for recording on the information recording medium for possibly avoiding the data volume in connection with the above-mentioned first problem, it becomes necessary in this case to transform the vector data or the picture-drawing commands into the display data, which raises the second of the above-mentioned problems. The result is the processing speed during the reproduction being lowered and the necessity for a high-performance hardware for executing the processing operations.

Besides, a graphic display circuit is necessitated for performing the graphic display in connection with the first and second problems with consequent rise in production costs for the reproducing device by the graphic display circuit. With the reproducing device having the above-mentioned compressed picture reproducing function, production costs are similarly raised by the addition of the graphic display circuits.

SUMMARY OF THE INVENTION

In view of the above-depicted status of the art, it is an object of the present invention to provide a picture reproducing device in which there is no such problem as increase in the data volume, lowering of the processing speed or the necessity for providing a high-performance hardware, and in which production costs may also be lowered.

According to the present invention, there is provided a video image reproducing apparatus for reproducing compressed video image information which includes data fetching means for fetching data from a recording medium on which there are recorded at least encoded initial video image data representative of a video image and a plurality of encoded updating video image data in the form of predictive video image data, the encoded updating video image data being capable of updating an initial video image on the premises that the initial video image is present, memory means, decoding means for decoding the encoded initial video image data and the encoded updating video image data to produce decoded initial video image data and decoded updating video image data, respectively, control means for initially transmitting the initial video image data to the decoding means, subsequently transmitting to the decoding means the particular updating video image data which are necessary to update the initial video image, and causing the memory means to store the decoded updating video image data, and display means supplied with the initial video image data for displaying the decoded initial video image data as a menu of selection icons. The control means, in response to a user input, causes selected decoded updating video image data to be read from the memory means, supplied to the display means, and the display means to display a changed menu of selection icons.

The memory means comprises an updating picture data storage area for transiently storing the updating picture data.

The picture reproducing apparatus also comprises key input means, which control means transmits the updating picture data associated with the key input at the key input means.

The decoding means decodes encoded picture data, which encoded picture data have been produced by transforming an input picture and a differential picture formed by taking a difference between the input picture and a picture produced by a pre-set prediction into pre-set coefficient data, and by encoding the resulting coefficient data.

Besides, if the encoded picture data is a moving picture, the updated picture data recorded on the recording medium is the picture data re-written continuously. The updated picture data, thus re-written continuously, is repeatedly read from the updating picture data storage area of the memory means and continuously transmitted to the decoding means under control by the control means.

That is, the present invention provides a picture reproducing device in which the picture display for a menu item display is performed by taking advantage of a decorder for compressed picture data employed for displaying the compressed moving/still picture for enabling menu data or the like to be displayed without employing a graphic display circuit.

With the picture display device of the present invention, since the updating picture data required for rewriting or displaying of menu items or the like is the compressed and encoded data, a smaller storage capacity on the recording medium for the updating picture data suffices. On the other hand, since the encoded initial picture data and the updating picture data are displayed after being decoded by the compressed picture decoder, the graphic display unit is dispensed with, while the processing speed may also be increased without loading the CPU of the reproducing device.

DESCRIPTION OF THE PREFERRED EMBODIMENTS

Figure 1:
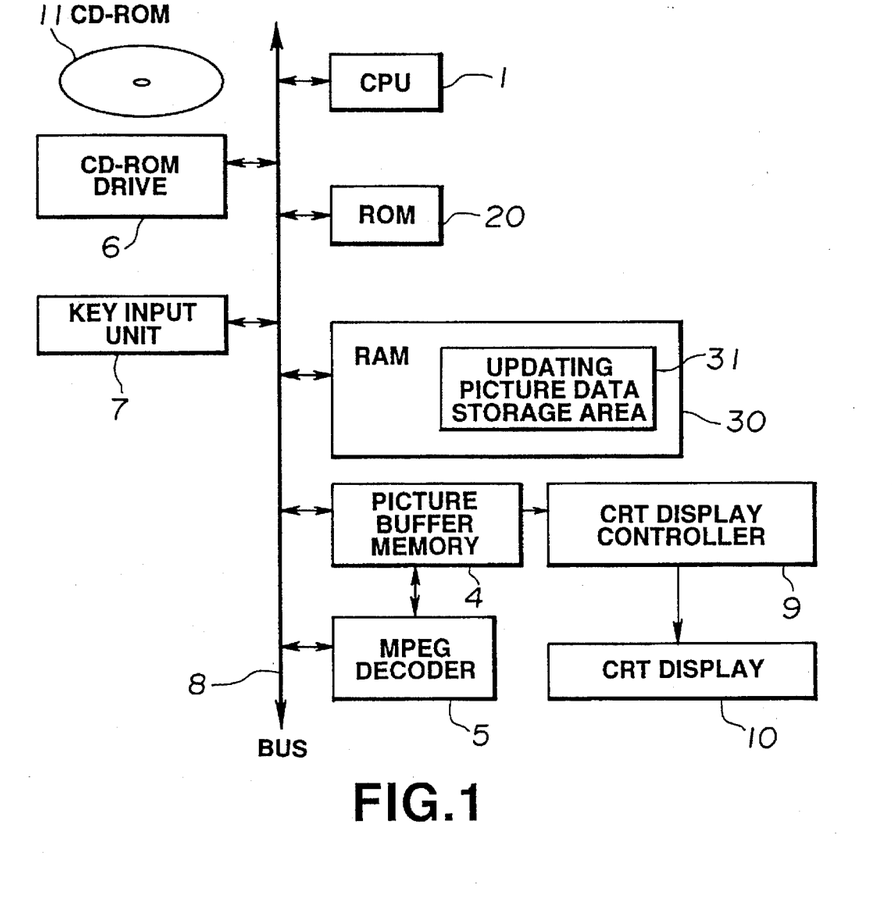
FIG. 1 is a schematic block circuit diagram showing the arrangement of a picture reproducing device according to the present invention.
Figure 2:
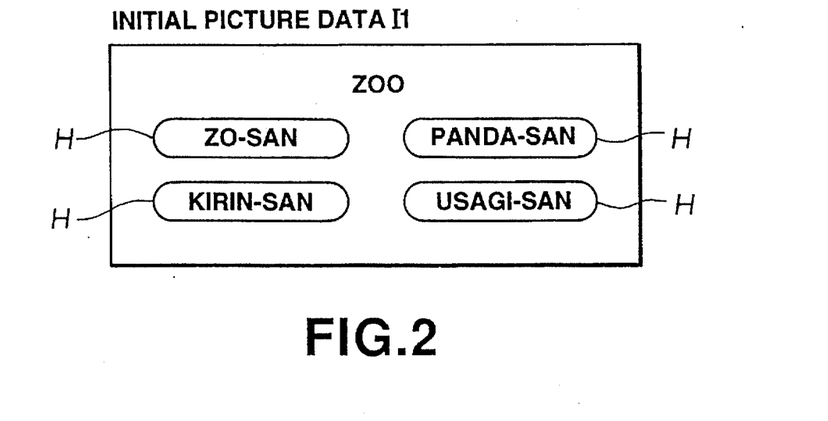
FIG. 2 is a diagrammatic view for illustrating the initial picture data.
Figure 3A:
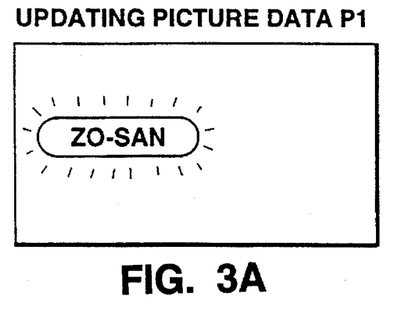
FIG. 3A–H are diagrammatic views for illustrating the updated picture data.
Figure 3B:
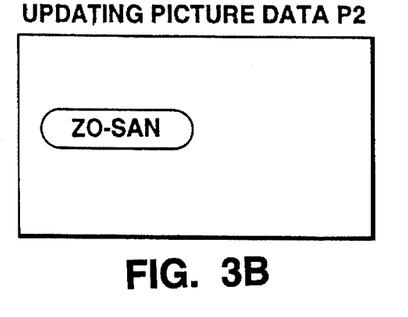
Figure 3C:
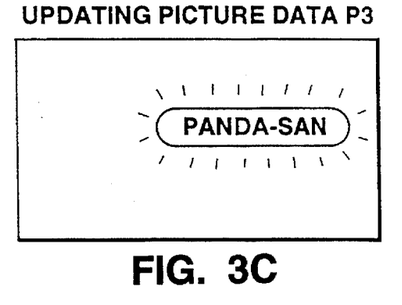
Figure 3D:
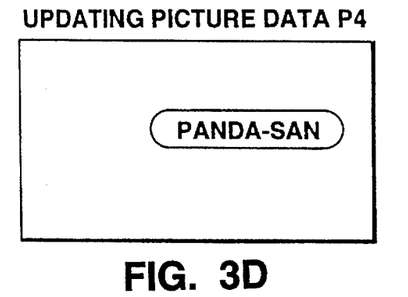
Figure 3E:
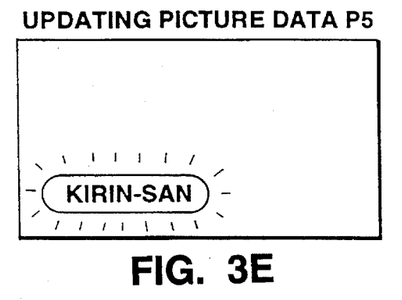
Figure 3F:
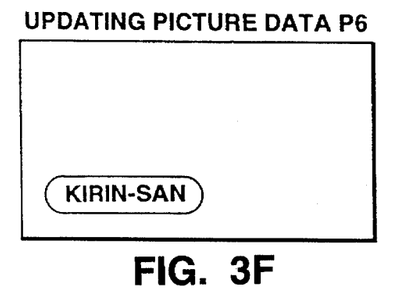
Figure 3G:
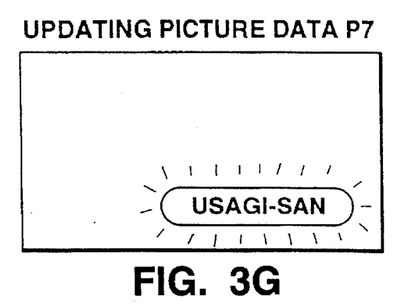
Figure 3H:
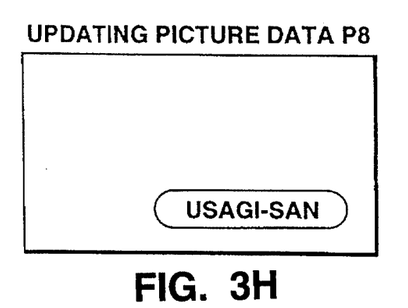

Referring to FIG. 1, the picture reproducing device according to the present invention comprises a CD-ROM drive 6, as data fetching means, for fetching data from a recording medium, such as a CD-ROM disc 11, on which at least encoded initial picture data I1 shown in FIG. 2 and encoded updating picture data P1 to P8 shown in FIG. 3 are recorded, a RAM 30 constituting memory means having a storage capacity of at least one frame, a decoding unit 5 for decoding the encoded picture data, and a CPU 1 for initially transmitting the initial picture data and subsequently transmitting the updating picture data to the decoder. The updating picture data includes all of possible patterns partially updating the initial picture given the presence of the initial picture.

The RAM 30 has an updating picture storage area 31 for transiently storing the updating picture data.

The picture reproducing device also has a key input unit 7, such as a keyboard. The CPU 1 fetches the updating picture data associated with the actuated key of the key input unit 7 from the updating picture data storage area 31 of the RAM 30 to transmit the fetched data to the decoding unit 5.

The decoding unit comprises an MPEG (Moving Picture Expert Group) decoder 5 for decoding the encoded picture data. For producing the encoded picture data, the input picture signals and the differential picture signals formed by taking a difference between the input picture signals and pictures produced by pre-set predictive coding, such as forward prediction, backward prediction or bi-directional prediction, are transformed into coefficient data of, for example, discrete cosine transform (DCT), followed by encoding.

Consequently, with the present embodiment, data of the intra-coded picture (I-picture) as prescribed by MPEG is employed as the initial picture data. On the other hand, data of the predictive-coded picture (P-picture) or data of the bi-directional predictive-coded picture (B-picture) is employed as the updating picture data. In FIGS. 2 and 3, I and P denote that the picture is the I-picture and the P-picture, respectively. In other words, the initial picture data is the intra-coded picture or I-picture and hence the picture may be constituted only from the data of the picture. Conversely, the updating picture data, which is the above-mentioned P-picture or the B-picture, are the picture data which cannot be meaningfully updated unless the initial picture is displayed. In the present embodiment, only the P-pictures are employed as the updated pictures.

With the picture reproducing device of the present invention, the CPU 1 mainly controls the key input unit 7 connected to a bus 8, the CD-ROM drive 6, the MPEG decoder 5 or a CRT display controller 9, while exchanging various data with various components of the device. The program employed for controlling by the CPU 1 is stored in a ROM 20. Data produced in the course of various arithmetic-logical operations performed by the CPU 1 are transiently stored in the RAM 30. Compressed picture data recorded on the CD-ROM 11 are decoded by the MPEG decoder 5 and transmitted via a picture buffer memory 4 so as to be displayed on a CRT display 10 controlled by the CRT display controller 9. The display 10 as the display means may be a liquid crystal display unit, in which case the controller 9 effects control adapted to liquid crystal display.

Meanwhile, the present embodiment is directed to selection of menu items displayed on the CRT display 10. For this reason, plural menu items as indicated by picture (icons) or buttons for selection by the user are displayed on the CRT display 10 as initial pictures for menu item selection, as shown in FIG. 2.

In the example shown in FIG. 2, the items of four different animal species kept in a zoo, that is elephant (zo-san), giant panda (panda-san), giraffe (kirin-san) and rabbit (usagi-san), are displayed as the initial picture. That is, the respective items are indicated in the form of buttons H on which appear the letters indicating the various animal species.

On the other hand, the updating picture data P1 to P8 shown in FIG. 3 are data for making partial re-writing of only selected ones of the respective items appearing on the respective buttons H of the initial picture data I1 indicating the various items of the initial picture data I1. Meanwhile, the updating picture data P1, P3, P5 and P7 are the picture data with the buttons associated with the indications of "zo-san", "panda-san", "kirin-san" and "usagi-san" being highlighted, or illuminated, while the updating picture data P2, P4, P6 and P8 are the picture data with the buttons associated with the indications of "zo-san", "panda-san", "kirin-san" and "usagi-san" being displayed without highlighting, that is without illumination.

The menu selection of selecting one of the menu items indicating the four animal species is explained.

The flow of processing for menu selection according to the present embodiment is explained with reference to the flow chart of FIG. 4 and the illustrative view of FIG. 5 associated with FIG. 4.

Figure 4:
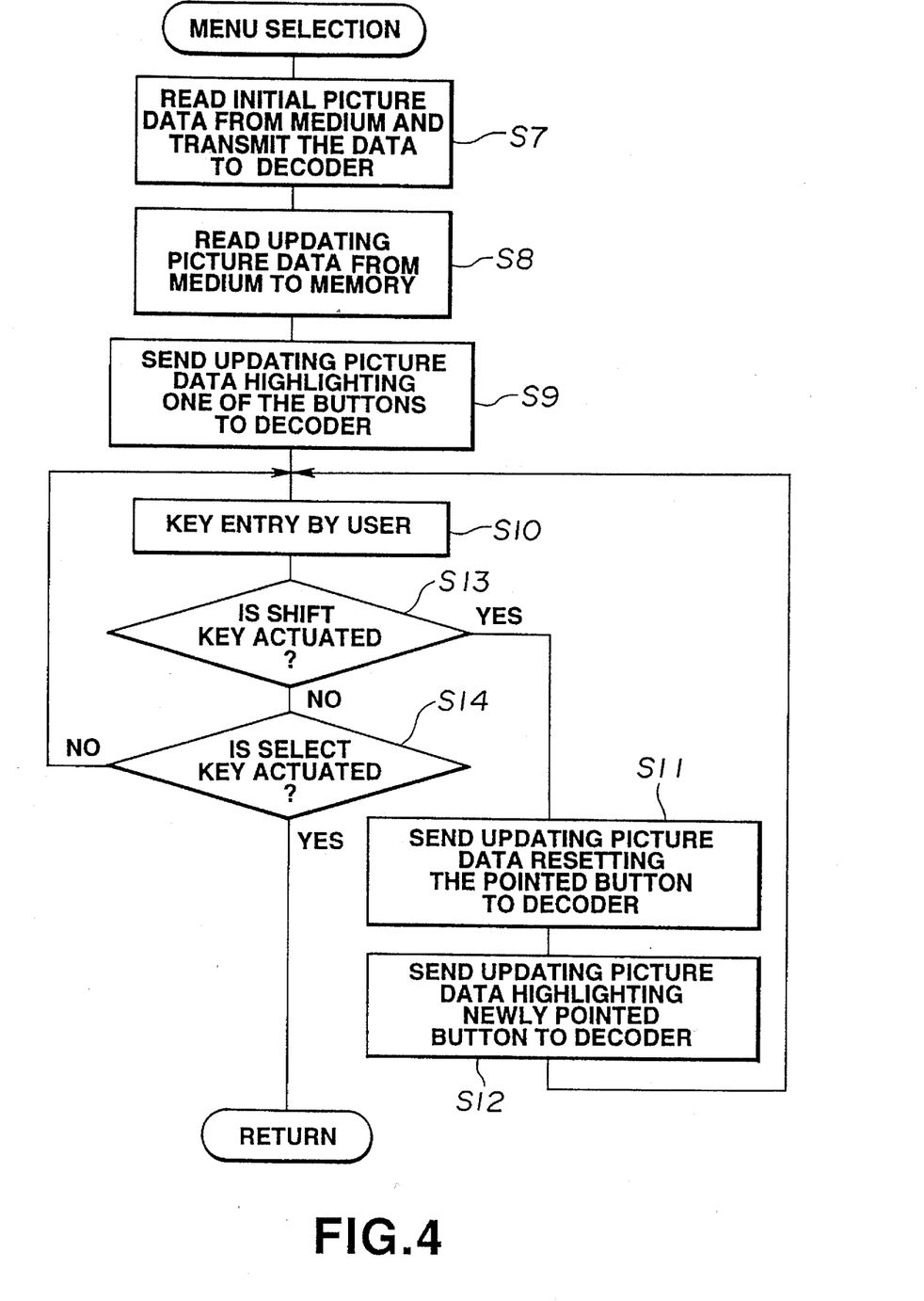
FIG. 4 is a flow chart showing the flow of processing for menu selection.

Referring to FIGS. 4 and 5, the initial picture data I1 shown at A in FIG. 5 is read at step S7 by the CD-ROM drive 6 from a disc 11 and transmitted via the picture buffer memory 4 to the MPEG decoder 5. The initial picture data is the background picture, as described above, so that, in the present example of the menu of a zoo, the picture of the zoo, not shown, is simultaneously displayed as the background picture along with the display by the respective buttons H.

At the next step S8, the data of the updating picture data P1 to P8 shown in FIG. 3 is read from the disc 11 into the updating picture data storage area 31 of RAM 30. By so doing, the updating picture data may be promptly transmitted to the MPEG decoder for the next picture updating without the necessity of reading the data from the disc 11 by the CD-ROM drive 6.

After the step S8, control proceeds to the step S9 in which a pointer indicating the menu item which the user intends to select is displayed on a display screen of the CRT display 10. That is, the pointer in the present embodiment indicates button which is about to be selected by the user. With the present pointer, this is indicated by highlighting the associated button. Instead of making the pointer indication by highlighting the display region of the buttons, the frames surrounding the display area of each button may be displayed, or a letter and/or a small-sized picture indicated in the display area of the button may be changed as time elapses. As an example of changing the small-sized picture displayed in the display area of the button indicating the picture of the elephant "zo-san", a picture of an elephant lying down may be changed to a picture of an elephant standing on its feet.

At the step S9, the updating picture data P1, in which one of the buttons H indicating "zo-san" is highlighted for indicating the initial position of the pointer, is transmitted to the decoder 5, as shown at B in FIG. 5. This causes only the button for "zo-san" to be highlighted as the pointer on the display screen, as shown at C in FIG. 5. At this time, the remaining buttons are not changed. This state is the "initial state of the menu". Although not shown, the background picture is also displayed in the picture of the initial state of the menu.

As the updating picture data, the updating picture data P1, P3, P5 and P7, with the respective buttons being highlighted, and the updating picture data P2, P4, P6 and P8, with the respective buttons not being highlighted, are in storage, as described above. One of these updating picture data is selected and transmitted to the decoder 5 for highlighting the button associated with the selected one of the updating picture data P1, P3, P5 and P7 or resetting the button associated with the selected one of the updating picture data P2, P4, P6 and P8 to the non-highlighted state. If plural ones of the updating picture data are selected, the plural buttons associated with the selected picture data are simultaneously highlighted or reset to the non-highlighted state.

If continuously re-written updating picture data are prepared and transmitted continuously to the MPEG decoder 5, partial/whole moving pictures may also be prepared, as in the case of the moving pictures. Since these data are put on the RAM 30, repetition of uninterrupted moving pictures, which can be transmitted continuously, may also be realized.

Figure 6:
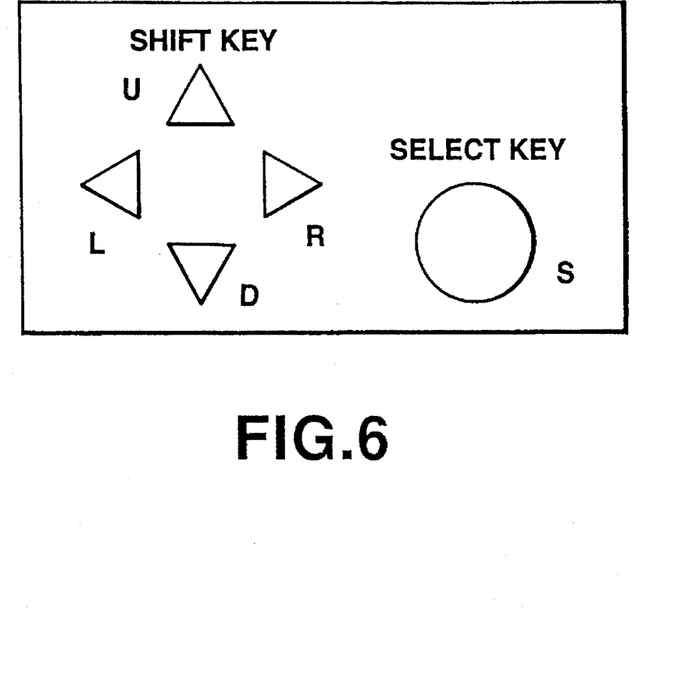
FIG. 6 shows a typical key input unit.

If, at the next step S10, the user selects one of the displayed items, the key of the key input unit or the remote controller actuated by the user is read. The key input unit 7 includes shift or movement keys U, D, L and R, indicating upward, downward, left and right directions, and a selection key S, as shown in FIG. 6.

At the step S13, the CPU 1 decides whether or not the key actuated by the user is the movement key. If the result of decision is YES, that is if the key actuated by the user is the movement key for shifting the pointer indicating the highlighted button, it becomes necessary to shift the pointer from the currently pointed button, that is the highlighted button, towards the button positioned in the indicated direction. To this end, control proceeds to the step S11.

At the step S11, if the actuated key is the movement key R for movement towards right, the updating picture data P2, as shown at D in FIG. 5, is transmitted to the decoder 5, so that the currently pointed and highlighted button is reset to the non-highlighted state. Simultaneously, at the step S12, the updating picture data P3 of highlighting the display area of the button associated with the display item of "panda-san" on the right-hand side of the button associated with the display item of "zo-san", as shown at E in FIG. 5, is transmitted to the decoder 5, for highlighting the button to which the pointer has been moved and which is now to be pointed. The sequence of transmitting these two data may be reversed from that described above, that is the sequence of the steps S11 and S12 may be reversed from that shown in FIG. 4.

This causes the button associated with the display item "panda-san" now pointed by the pointer to be highlighted, as shown at F in FIG. 5. After the step S12, control reverts to the step S10.

The foregoing description has been made of an example in which the movement key R in FIG. 6 is actuated and the result of decision in the step S13 is YES, If the result of decision at the step S13 is NO, control proceeds to the step S14.

At this step S14, a decision is given as to whether or not the selection key S shown in FIG. 6 is actuated. If the result of decision at the step S14 is NO, control reverts to the step S10. If the key actuated by the user is the selection key S for menu item selection, a decision of YES is given at the step S14 to terminate the menu selection.

Figure 5A:
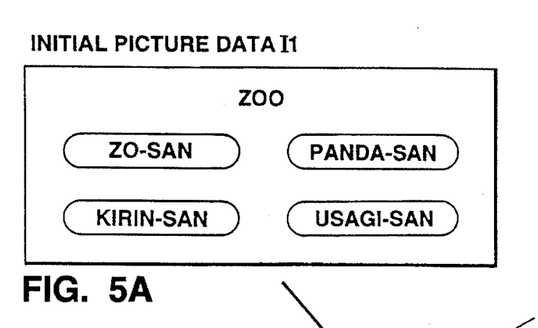
FIG. 5A–F are diagrammatic views for illustrating the picture data correlated with the flow chart for menu selection.
Figure 5B:
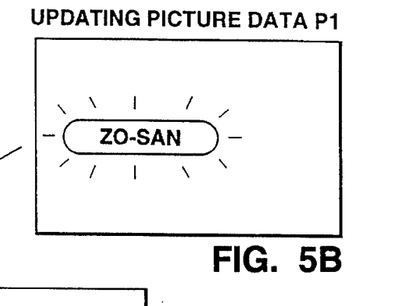
Figure 5C:
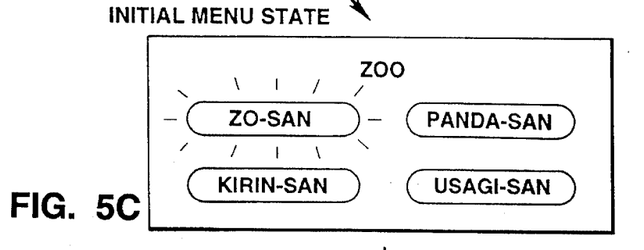
Figure 5D:
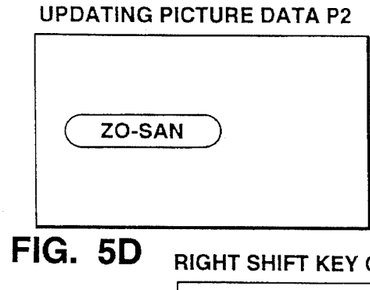
Figure 5E:
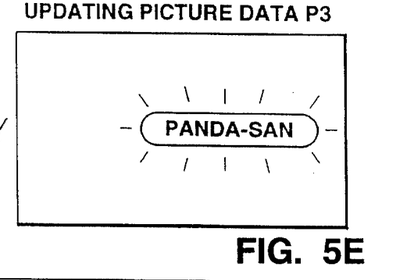
Figure 5F:
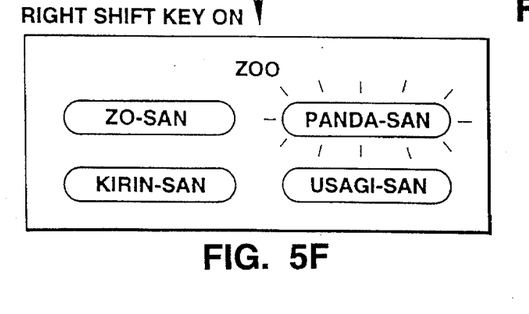
Figure 7:
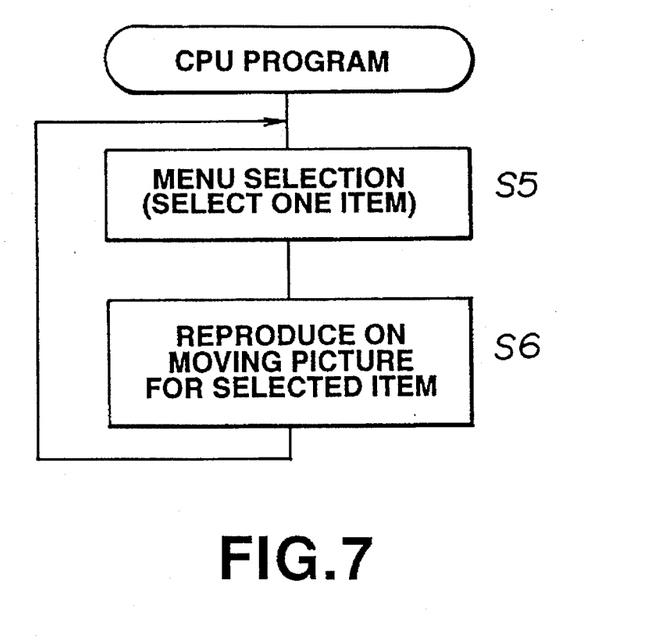
FIG. 7 is a flow chart for illustrating the basic operation of the picture reproducing device according to the present invention.

The flow chart of FIG. 7 shows, in a simplified manner, the processing for picture reproduction which is performed by the picture reproducing device of the present invention. That is, if the user selects the desired menu item, the user shifts the pointer to the button associated with the item desired to be selected, for highlighting the button, and actuates the selection key for selecting the highlighted button, as shown in FIG. 7. The reproducing device now performs the operation associated with the selected button. That is, the reproducing device reproduces the moving pictures for the highlighted button associated with the pointed menu item. For example, if the pointed menu item is "panda-san", as shown at F in FIG. 5, the moving pictures of the giant panda are reproduced in a manner not shown.

In the illustrated embodiment, the updating picture data are stored in the updating picture data storage area 31 of the RAM 30. Alternatively, the updating picture data may also be stored in a similar storage area provided in the picture buffer memory 4.

Besides, while the picture buffer memory 4 and the decoder 5 are shown as separate components in the example of FIG. 1, the picture buffer memory 4 may also be built in the decoder 5.

Figure 8:
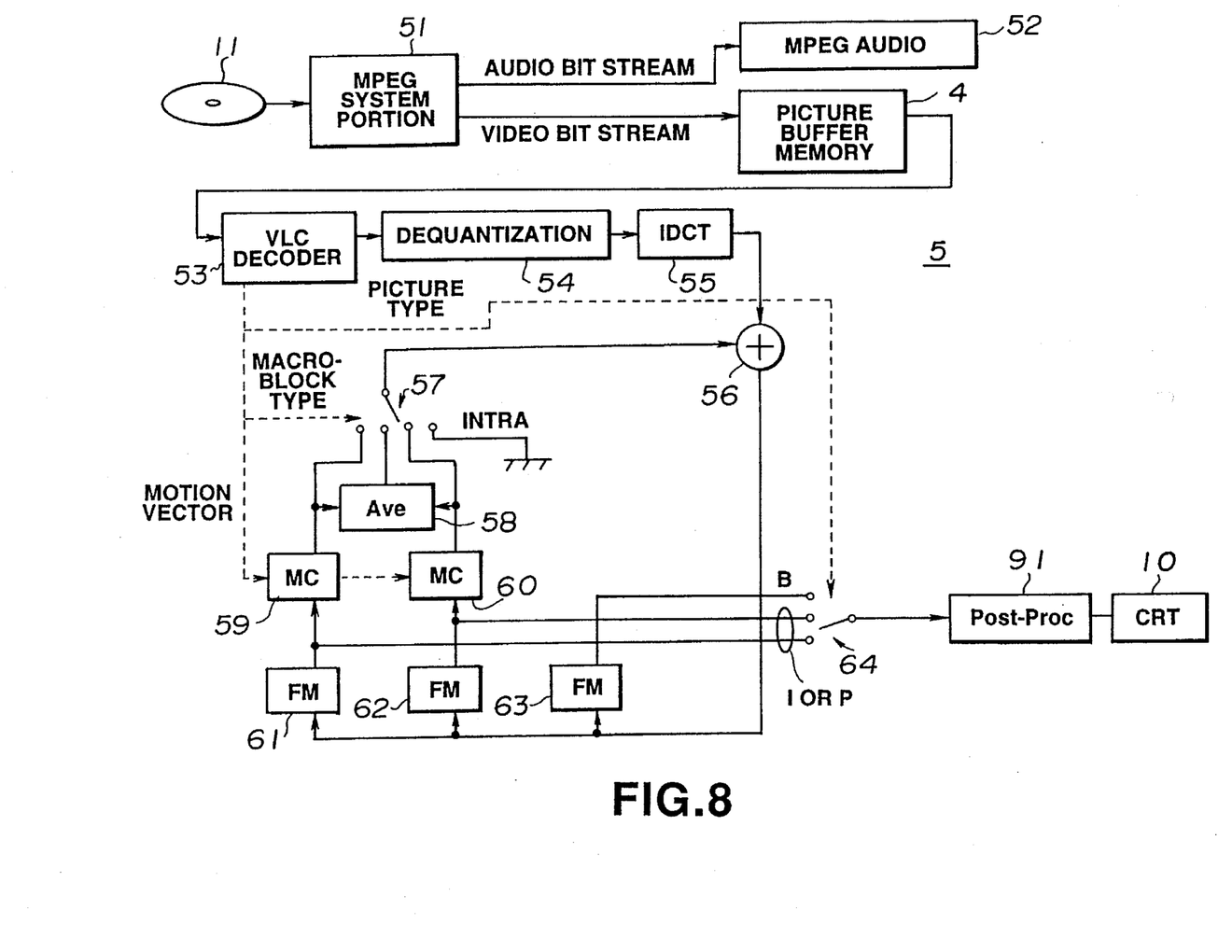
FIG. 8 is a block circuit diagram for illustrating details of an MPEG decoder.

FIG. 8 illustrates a concrete arrangement of the MPEG decoder 5. In the present example of FIG. 8, the picture buffer memory 4 is mounted within the decoder 5 and the updating picture data storage area is provided within the buffer memory 4. In FIG. 8, the same components as those shown in FIG. 1 are denoted by the same reference numerals as those used in FIG. 1.

Referring to FIG. 8, there are at least three frame memories 61, 62 and 63 in the decoder 5. The data flow from the disc 11 as the information recording medium is separated into an audio data bitstream and a video data bitstream at an MPEG system portion 51. The audio data bitstream is processed by an MPEG audio processor 52 and thence supplied to downstream components, such as an amplifier or a loudspeaker, not shown.

The video data bitstream is stored once in the picture buffer memory 4 and thence supplied to a VLC decoder 53 which is a counterpart of a variable length encoder (VLC) used for MPEG picture encoding. The video data bitstream is separated by the VLC decoder 53 into various data, such as quantized DCT coefficients, macro-block type indicating data, picture type indicating data, that is data indicating the predictive-coded data, backward predictive-coded data or the bi-directionally predictive-coded data, or motion vector data. The macro-block is the encoding unit used in MPEG and is made up of six blocks, that is four neighboring luminance blocks, that is left, right, upper and lower luminance blocks, and two chroma blocks Cb, Cr located at the same position as the luminance blocks on the picture. Each of the above blocks is made up of neighboring 8 lines by neighboring 8 luminance or chroma pixels and represents a DCT unit.

Of the various data separated by the VLC decoder 53, the quantized DCT coefficients are transmitted to an inverse quantization circuit 54. The motion vector data is supplied to motion compensation circuits 59, 60 as later explained, while the macro-block type indicating data and the picture-type indicating data become respectively the switching control signals for a changeover switch 57 as later explained and switching control signals for a changeover switch 64 as later explained.

The inverse quantization circuit 54 performs an inverse quantization, an operation which is the reverse of the quantization as used for encoding, on the quantized DCT coefficients separated at the VLC decoder 53. The DCT coefficient data from the inverse quantization circuit 54, is transmitted to an IDCT circuit 55 for inverse DCT. The IDCT circuit 55 performs IDCT on the DCT coefficient data. By the IDCT, picture data is produced for the intra-coded picture (I-picture), while difference data corresponding to a output of the changeover switch 57 as later explained is produced for the predictive-coded picture (P-picture) or backward predictive-coded picture or bi-directional predictive-coded picture (B-picture). The picture data and the difference data are supplied to an additive node 56.

For the forward, backward and bi-directional prediction modes, motion-compensated predictive-coded picture data from half-pel motion compensation circuits 59, 60 or an averaging circuit 58 is supplied to the additive node 56 via the changeover circuit 57 which is changed over depending on the macro-block type. That is, the changeover switch 57 selects an output of the motion compensation circuit 60, an output of the motion compensation circuit 59 and an output of the averaging circuit 58 when the macro-block type corresponds to the forward predictive mode, backward predictive mode or to the bi-directional predictive mode, respectively. The motion compensated prediction-coded picture data and the difference data via the changeover switch 57 are added together by the additive node 56 to reproduce the picture data.

The picture data thus reproduced are stored in the frame memories 61, 62 and 63. If the picture is the I-picture, it is stored in the frame memory 61 or in the frame memory 62. If the picture is the P-picture, it is motion-compensated on the basis of the macro-blocks stored in one of the frame memories 61 or 62 by an associated one of the motion compensation circuits 59, 60 and is transmitted via the changeover switch 57 to the additive node 56. This permits pixel values at the positions corresponding to the macro-block to be added to the picture to produce the picture data. The picture data produced in this manner is stored in the other frame memory. With the I-picture and the Picture, the two frame memories 61 and 62 are employed alternately, That is, during the processing of the I-picture and the P-picture, data of the frame memory in which data is not being written is outputted.

On the other hand, if the picture is the B-picture, the frame memories 61, 62 are used in a parallel manner for motion compensation. That is, with the B-picture data, the data read out from the two frame memories 61, 62 are transmitted to the associated motion compensation circuits 59, 60, respectively. The motion compensation circuits 59, 60 effect motion compensation, using the motion vector kept in store, and resulting predicted pixel values are transmitted to the averaging circuit 58. The averaging circuit 58 finds an average value which is supplied via the changeover switch 57 to the additive node 56. The playback picture thus produced is outputted after storage in the frame memory 63.

With the above-described constitution, it becomes possible to change the sequence of the decoded pictures.

The frame data from the frame memories 61, 62 and 63 is supplied to a changeover switch 64 the changeover operation of which is controlled depending on the picture type. If the picture type is the B-picture, the changeover switch 64 selects an output of the frame memory 63. If the picture type is the I-picture or the P-picture, the changeover switch selects outputs of the frame memories 61, 62. An output of the changeover switch 64 is transmitted to a transforming circuit 91 for the CRT display controller 9. The transforming circuit 91 transforms the picture data supplied thereto into signals conforming to the NTSC television system. The picture signals from the transforming circuit 91 are supplied to the CRT display 10.

The picture buffer memory 4 in the embodiment shown in FIG. 8 has two functions, namely the function of the frame buffer and the function of a buffer area to permit the decoder 5 to decode the video bitstream at a moderate Fate. The picture buffer memory 4 has a capacity equal to the capacity of three frame buffers, or 128 Kbytes×3 Kbytes, while the buffer has the capacity on the order of 50 to 60 Kbytes.

In the embodiment of FIG. 8, the initial picture data I1 and the updated picture data P1, for example, are synthesized in the following manner.

That is, since the initial picture data I1 is the I-picture having the information capable of re-writing the entire picture irrespective of the state of the previous picture. Consequently, if the initial picture data I1 is supplied to the decoder 5, the entire picture is replaced by the initial picture data. On the other hand, the updating picture data is the updating data of particular picture portions inclusive of the position information, and contains data for re-arranging picture data using the values of the directly preceding picture data. The updating picture data may also contain data totally replacing the particular potions of the directly preceding picture data. Above all, if the data of the latter type of the data is used, the particular picture portion may be replaced irrespective of the state of the directly preceding picture.

Figure 9:
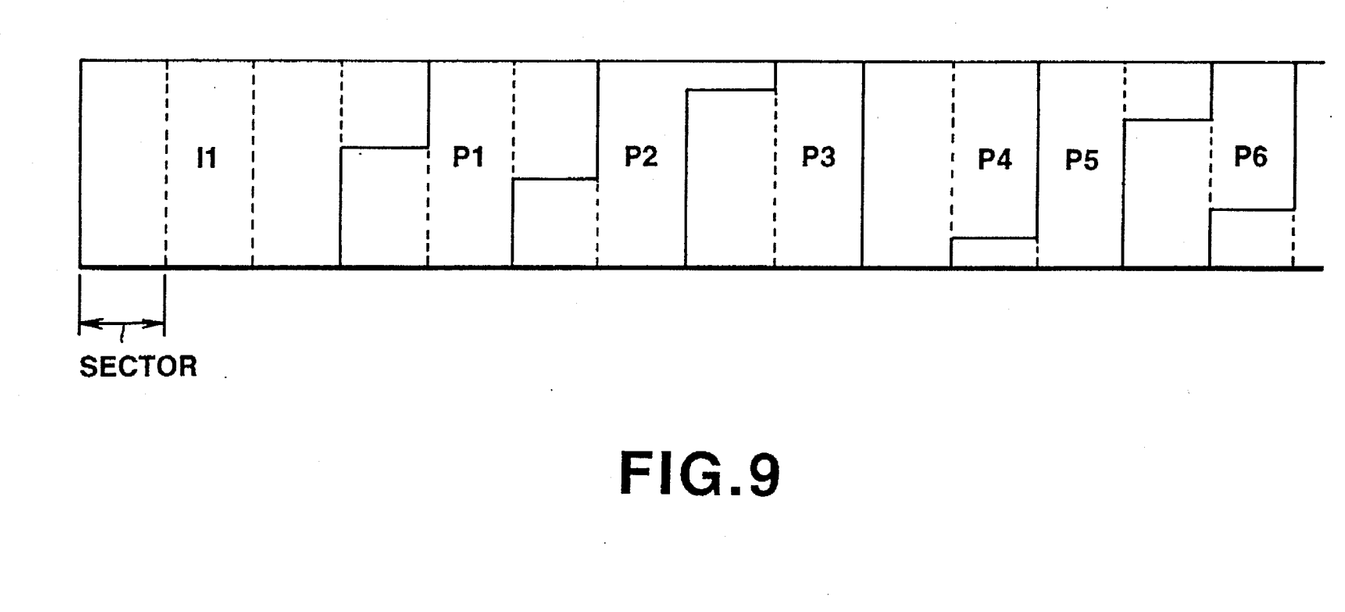
FIG. 9 is a diagrammatic view for illustrating the initial picture data and updated picture data arranged on disc sectors.

The compressed picture data file for the above-mentioned initial picture data I1 and the updating picture data P1 to P8 may be arranged on the sectors of the disc 11 as shown for example in FIG. 9.

With the above-described picture reproducing device according to the present invention, the display of menu items or the like processing operations, so far performed by a graphic display circuit, may be made on a screen of a CRT display by employing the MPEG decoder 5 as the compressed picture decoder.

What is claimed is:

1. A video image reproducing apparatus for reproducing compressed video image information, comprising:

data fetching means for fetching data from a recording medium on which there are recorded at least encoded initial video image data representative of a video image and a plurality of encoded updating video image data in the form of predictive video image data, the encoded updating video image data being capable of updating an initial video image on the premises that the initial video image is present, memory means having a capacity of at least one image frame, decoding means for decoding the encoded initial video image data and the encoded updating video image data to produce decoded initial video image data and decoded updating video image data, respectively, control means for initially transmitting the initial video image data to the decoding means, subsequently transmitting to the decoding means the particular updating video image data which are necessary to update the initial video image, and causing the memory means to store the decoded updating video image data, display means supplied with the decoded initial video image data for displaying the decoded initial video image data as a menu of selection icons and wherein the control means, in response to a user input, causes selected decoded updating video image data to be read from the memory means, supplied to the display means, and the display means to display a changed menu of selection icons.

2. The video image reproducing apparatus as claimed in claim 1 wherein the memory means has an updating video image data storage area for storing the decoded updating video image data.

3. The video image reproducing apparatus as claimed in claim 1 further comprising key selection means, the control means transmitting the updating video image data associated with a selection of a key at the key selection means by a user to the display means.

4. The video image reproducing apparatus as claimed in claim 1 wherein the decoding means decodes encoded video image data, the encoded video image data having been produced by transforming an input video image and a differential video image, formed by taking a difference between the input video image and a video image produced by a pre-set predictive coding, into pre-set coefficient data, and by encoding the resulting coefficient data.

5. A video image reproducing apparatus for selectively reproducing compressed video image information, comprising:

data fetching means for fetching data from a recording medium on which there are recorded at least encoded initial video image data representative of a video image and a plurality of encoded updating video image data in the form of predictive video image data, the encoded updating video image data being capable of updating an initial video image on the premises that the initial video image is present;

decoding means for decoding the encoded initial video image data and the encoded updating video image data to produce decoded initial video image data and decoded updating video image data, respectively;

memory means, the memory means having an updating video image data storage area for storing the decoded updating video image data;

control means for initially transmitting the initial video image data to the decoding means, subsequently transmitting to the decoding means particular updating video image data which are necessary to update an initial video image, and causing the particular updating video image data decoded by the decoding means to be stored in the updating picture data storage areas of the memory means;

display means for displaying the initial video image as updated by the decoded updating video image data;

key operated input means which includes a plurality of keys, which, when a selected key is activated by a user, causes the control means to transmit from the updating video image data storage area of the memory means a decoded updating video image data associated with the selected key to the display means.

6. A video image reproducing apparatus as claimed in claim 5, wherein the initial video image includes an image of a menu of a plurality of icons and the updating video image data updates the initial video image so that one or more of the icons is designated as a currently selected icon.

7. A video image reproducing apparatus as claimed in claim 6, wherein full motion, compressed video image data are recorded on the recording medium and wherein the control means, in response to a selection key of the key operated input means, causes particular compressed video image data associated with the currently selected icon to be fetched by the data fetching means from the recording medium, decoded by the decoding means, and displayed by the display means.

8. The video image reproducing apparatus as claimed in claim 5, wherein the decoding means decodes encoded video image data, the encoded video image data having been produced by transforming an input video image and a differential video image, formed by taking a difference between the input video image and a video image produced by a pre-set predictive coding, into pre-set coefficient data, and by encoding the resulting coefficient data.

9. A video image reproducing apparatus as claimed in claim 8, wherein the encoded video image data is encoded according to a format of the Motion Pictures Experts Group (MPEG).

* * * * *

UNITED STATES PATENT AND TRADEMARK OFFICE
CERTIFICATE OF CORRECTION

PATENT NO.   : 5,457,675
DATED        : October 10, 1995
INVENTOR(S)  : Kazuhiro Suzuki, et al.

It is certified that error appears in the above-indentified patent and that said Letters Patent is hereby corrected as shown below:

On the title page:

Item: [57] Abstract, line 6, please change "a RAN having" to --a RAM having--.

Signed and Sealed this

Twenty-sixth Day of December, 1995

Attest:

BRUCE LEHMAN

*Attesting Officer*           *Commissioner of Patents and Trademarks*